Dec. 31, 1957 G. E. BATCHELDER ET AL 2,818,198
PREDETERMINING DISPENSING APPARATUS
Filed Feb. 17, 1954 6 Sheets-Sheet 1

INVENTORS
GEORGE E. BATCHELDER
EINAR THORESEN
FRITZ NIESEMANN
BY Strauch, Nolan & Diggins
ATTORNEYS

Dec. 31, 1957 G. E. BATCHELDER ET AL 2,818,198
PREDETERMINING DISPENSING APPARATUS
Filed Feb. 17, 1954 6 Sheets-Sheet 4

INVENTORS
GEORGE E. BATCHELDER
EINAR THORESEN
FRITZ NIESEMANN
BY Strauch, Nolan & Diggins
ATTORNEYS

United States Patent Office

2,818,198
Patented Dec. 31, 1957

2,818,198

PREDETERMINING DISPENSING APPARATUS

George E. Batchelder, Einar Thoresen, and Fritz Niesemann, Pittsburgh, Pa., assignors to Rockwell Manufacturing Company, Pittsburgh, Pa., a corporation of Pennsylvania Application February 17, 1954, Serial No. 410,975

16 Claims. (Cl. 222—20)

This invention relates to fluid dispensing apparatus and more particularly to improvements in such apparatus for measuring and delivering a predetermined quantity of fluid and for automatically cutting off the delivery of fluid when the desired quantity has been delivered.

The invention in its preferred embodiment relates to the dispensing of large quantities of fluid at high velocity through a line having a flow control valve. Should the valve attempt to quickly and completely cut off the flow of fluid in one single stage of closing when the predetermined quantity has been dispensed, the hydraulic hammer caused by this quick cut-off would result in undue shock and damage to the valve, meter and other elements in the fluid line and may break the valve latching mechanism.

Furthermore in such high velocity large quantity fluid flow systems a single valve capable of such quick cut-off would have to be extremely powerful and speedy in action but delicately timed for accurate control, and such a valve and its control and actuating mechanism would be expensive and require constant attention to maintain its accuracy. Various types of single stage closure valve assemblies have been tried for the purpose but they have been mainly inefficient or so complicated or expensive as to prove unacceptable for practical purposes and have been discarded.

Consequently it has been proposed to provide apparatus wherein the delivery of fluid is cut-off in gradual stages. For example it has been proposed that a meter in the fluid line operate a preset predetermined register mechanism which through some device such as a latch box will effect staged closing of the line. Usually this is done by closing a main valve when the greater part of the desired quantity of fluid has been delivered and continuing flow at a reduced rate through a smaller valve which is triggered at the proper time to complete the flow cut-off.

This prior two stage plural valve fluid cut-off apparatus has proved to some extent satisfactory in operation but it involves a multiplicity of small complex parts particularly in the latch mechanism for the valve and the valves used in association with such mechanism have been mechanically complex.

It has also been suggested to provide two stage closure of a single valve but such mechanisms have been complex and difficult to maintain in accurate adjustment.

The present invention provides for latching a single valve in an open position and for accomplishing plural stage closing of that single valve with a relatively simple uncomplicated structure. The number of parts has been reduced and the operation simplified as compared to structures formerly used in such mechanisms. The invention includes an improved valve latching mechanism in novel combination with an improved valve structure and a novel predetermining register. The new valve structure incorporates a fluid pressure balancing means together with a pressure equalizing pilot valve opened prior to moving the valve to open position to facilitate opening of the valve. This invention further contemplates an improved register latch release mechanism to enable accurate and improved operation during both high and low rates of fluid delivery.

With these and other considerations in view the major object of this invention is to provide a novel predetermining fluid dispensing apparatus for automatically cutting off the flow of fluid through a line after a predetermined quantity of fluid has been metered which is of improved construction and embodies a new mode of operation.

It is a further object of the invention to provide in novel combination a meter driven register operably connected to a single valve through a special settable trip and latch mechanism.

It is a further object of the invention to provide a meter driven register having a novel settable trip mechanism specially coacting with a novel valve latch mechanism for effecting an improved multi-stage closure of the valve.

Another object of the invention is to provide in a predetermining fluid dispensing apparatus a novel coaction between the register trip mechanism and the valve latching mechanism wherein a trip element is actuated upon delivery of successive predetermined quantities of fluid to move between limit positions where it successively controls staged closure of the valve.

Another object of the invention is to provide a novel fluid flow metering and control mechanism effective to cut off the flow of fluid in at least three successive stages to thereby reduce to a minimum the hydraulic shock in the line and its resulting damages to the meter and other equipment.

Another object of the invention is to provide a novel fluid flow control valve of greatly simplified construction, the operation of which, from open to closed position, is controlled by the meter register and latching device in three or more stages.

A still further object of the invention is to provide a novel pilot-operated, hydraulically balanced fluid flow control valve, the construction of which is greatly simplified over the prior art valves.

A further object of the invention resides in the provision of an improved positive shifting predetermining register mechanism.

A still further object of the invention resides in the provision of a novel mechanism for adjusting the final cut-off movement of the predetermining register.

A still further object of the invention resides in an improved plural stage valve latching mechanism.

An additional object of the invention is to provide a simple and reliable valve latching unit and associated predetermining register mechanism which cooperate in a novel manner to close the valve in a series of successive stages terminating in positive clean shut-off after a predetermined quantity of fluid has been metered and dispensed.

It is also an object of the present invention to provide a compact, space-saving assembly of the meter, valve, register and latching unit and associated connections so that the assembly may be readily installed where space limitations are a controlling factor.

With the above and other objects in view, the invention comprises the improved predetermining dispensing mechanism for fluid meters and the construction and relative arrangements of its several component parts, as will hereinafter be more fully described, illustrated in the accompanying drawings, and subsequently incorporated in the appended claims.

*General assembly*

Figures 1, 2, 3:
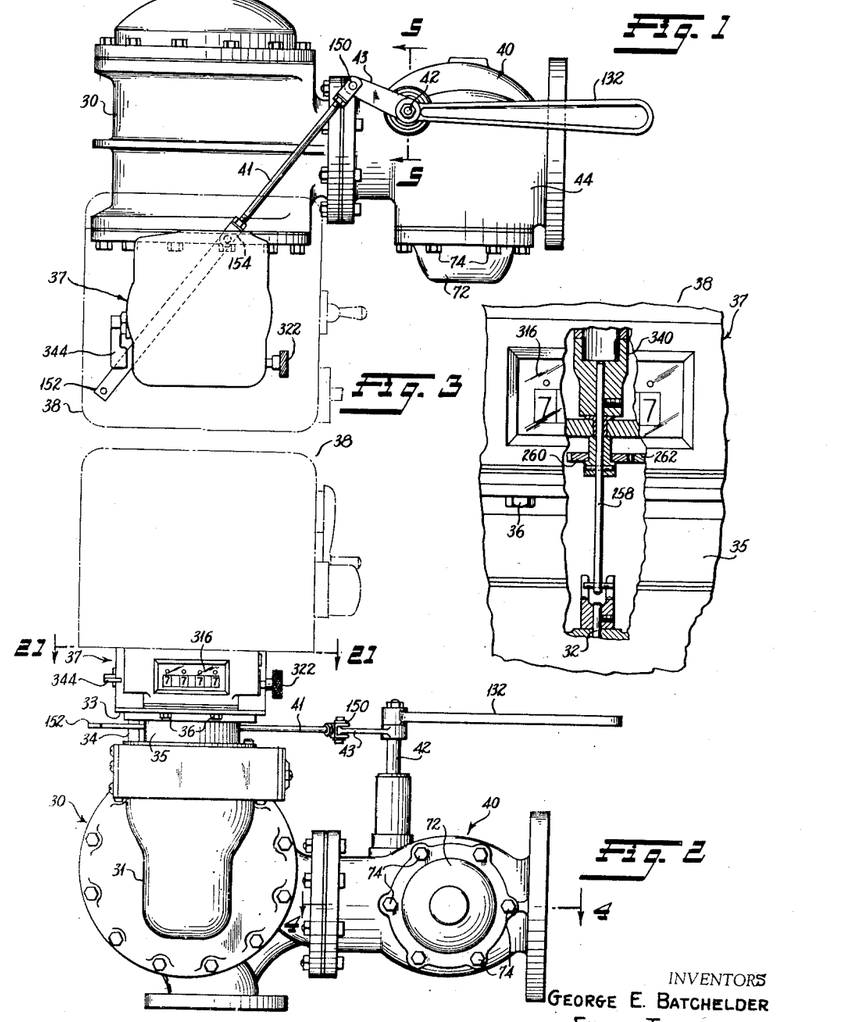
Figure 1 is a plan view of the general assembly of the meter, register valve and control linkage.
Figure 2 is a front elevation of the assembly shown in Figure 1.
Figure 3 is an enlarged portion of Figure 2 certain parts being broken away to show the drive means from the meter through the latch box to the predetermining register and totalizing register.

For purposes of illustration, in Figures 1 and 2 of the drawings there is disclosed a preferred general assembly of the several component units of our present invention. The fluid pressure operated meter 30 is preferably of the well-known "Rotocycle" type, an example of which is disclosed in United States Patent No. 2,274,206, issued February 24, 1942. The meter is provided with a cast vertical end housing section 31 which encloses a vertically extending continuously driven meter operated drive shaft 32 of Figure 3. Clamped between the upper end of the housing 31 and a base plate 33, as by machine screws passing through spacers 34, is a latch box unit indicated generally by the numeral 35. Rigidly mounted on the base plate 33, as by screws 36, is a housing unit 37 which contains the settable predetermining register mechanism. The totalizing register 38 is secured to the top of housing 37 by suitable means (not shown).

The quantity control valve unit 40 is rigidly attached to the outlet of the fluid meter 30 and is operatively connected to the valve latching unit 35 by a rod 41, arm 43, and shaft 42. Although the illustrated assembly is preferable, the valve unit 40 may alternatively be connected to the inlet side of the meter without exceeding the scope of invention.

*Valve*

Figure 4:
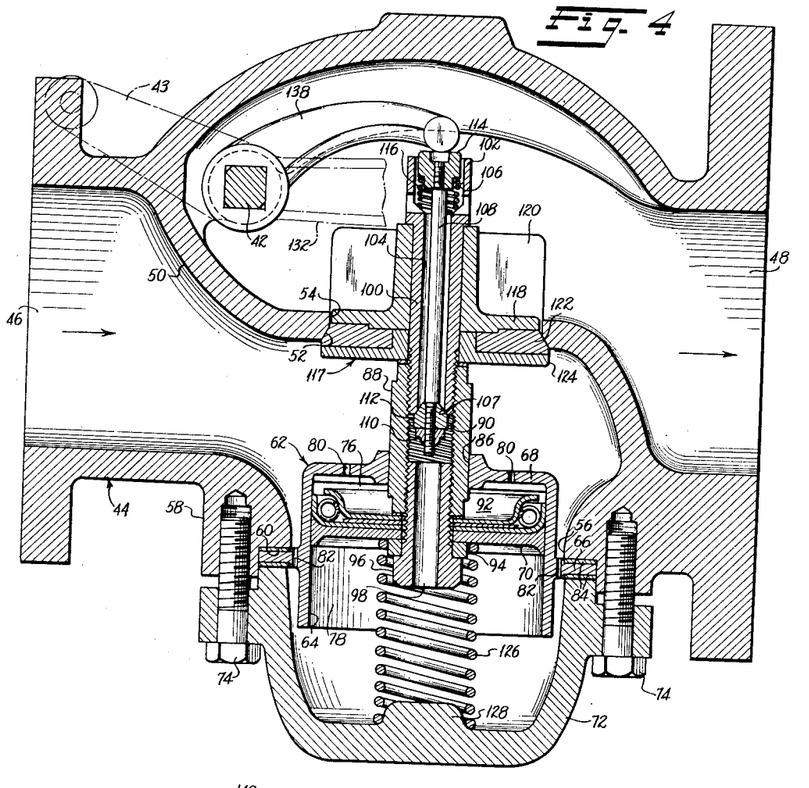
Figure 4 is a horizontal section of the pilot operated valve taken along the lines 4—4 of Figure 2.
Figure 5:
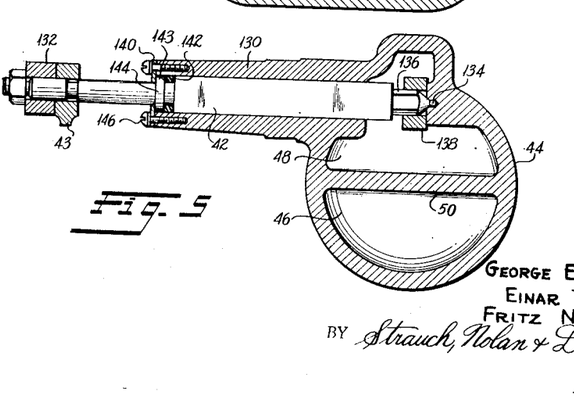
Figure 5 is a section taken along the lines 5—5 in Figure 1 showing the valve operating arm and shaft.

The details of the valve construction are shown in Figures 4 and 5 and comprise a main body casting 44 which has aligned fluid inlet and outlet passages therein, respectively numbered 46 and 48. Passages 46 and 48 are separated from each other by a transverse web 50 which is integrally formed with the body 44. A circular opening 54 formed in web 50 permits fluid communication between the passages 46 and 48 and has a tapered valve seat 52 formed on the lower portion of its periphery. Coaxial with opening 54 is an opening 56 in the valve body 44, around which extends a circular flange 58. An annular shoulder 60 is milled into flange 58 to provide an annular abutment coaxial with openings 54 and 56. Received within opening 56 is a rigid plunger housing 62 consisting of cylindrical side wall 64 having integrally formed on the exterior thereof a laterally extending annular flange 66 adapted to seat on the annular shoulder 60 in flange 58. The plunger housing 62 is completed by an integral top wall 68 and reciprocally receives a plunger or piston 70 having a concentric bore therein. An access cap 72 is secured to the valve body 44 by bolts 74 so as to clamp the annular flange 66 between the shoulder 60 and the access cap 72 to thus hold the plunger housing 62 rigidly in position within the valve body 44. The interior of plunger housing 62 is divided into chambers 76 and 78 by means of plunger 70. Chamber 76 is connected to inlet passage 46 by a plurality of passages 80 drilled through top wall 68 of housing 62 and sufficient in number to permit relatively unrestricted fluid flow into and out of chamber 76. Chamber 78 is connected with inlet passage 46 by predetermined orifice bleed passages 82 drilled through the annular flange 66 closely adjacent the side wall for a purpose explained below. Gaskets 84 on both sides of flange 66 prevent escape of fluid between valve body 44 and access cap 72.

Extending through a central bore 86 in the top wall of housing 62 is a valve sleeve 88, also termed the lower portion of the valve stem, which has an axially extending threaded bore 90. The valve sleeve 88, concentrically bored spring clip seal assembly 92, plunger 70 and a washer 94 are assembled and clamped in respective abutting relation by a hollow screw 96 passing through the washer, plunger and seal assembly and threaded into bore 90. The internal axially extending bore 98 of screw 96 connects valve sleeve bore 90 with chamber 78.

The main valve stem 100 has a head portion 102 and is externally threaded on its lower end. Stem 100 has axially extending internal bore 104 connecting at one end with a counterbore 106 in the head portion 102, and terminating at its opposite end in an annular valve seat 107 formed on the lower end of the valve stem. A pilot valve stem 108 extending through bore 104 has a threaded undercut portion at its lower end holding a pilot valve element 112 clamped against the stem body by a nut 110 threaded on the end of the stem. A pilot valve head 114 is threaded to the upper end of pilot valve stem 108 within counterbore 106 of valve stem 100 and a spring 116 is compressed between head 114 and the shoulder formed between counterbore 106 and bore 104. Spring 116 biases the pilot valve member 112 against the seat 107 formed on the lower end of main valve stem 100, thereby closing off the passage 104 from bore 90. It will be noted that ample clearance exists between the pilot valve stem 108 and the bore 104 and between the pilot valve head 114 and the wall of counterbore 106 to permit flow of fluid through counterbore 106, bore 104, 90 and 98 when the valve member 112 is unseated.

The main valve member 117 consists of a guide member 118, a resilient valve member 122 and a back-up plate 124, all of generally circular configuration in plan and all mounted on main valve stem 100 by means of suitable central coaxial bores extending respectively therethrough. The main valve stem 100 is threaded into bore 90 in valve sleeve 88 to clamp the guide member 118, valve member 122 and plate 124 between the sleeve head portion 102 and the upper end of valve sleeve 88 in such a manner that the guide member 118 extends through opening 54 in web 50. When the valve is in its closed position, as shown in Figure 4, resilient valve member 122 is seated on seat 52 to close off the outlet passage 48 from inlet passage 46. Integrally formed on guide member 118 are four radially extending vanes 120 which serve to pilot or guide the main valve assembly in the opening 52 during opening and closing movements. A spring 126 is compressed between the plunger 70 and the access cap 72 and is piloted thereon by a boss 128. Spring 126 bears against the plunger 70 and serves to normally urge the main valve assembly towards a closed position.

Referring particularly to Figures 1, 2 and 5, a vertically extending sleeve 130 is integrally formed on valve body 44. Journalled for rotary motion therein is a shaft 42, the lower end of which is piloted in the valve body 44 as shown at 134. The shaft 42 has a squared end portion 136. Fixed on the square portion for rotary movement therewith is a lever 138 (Figures 4 and 5), the free end of which bears against pilot valve head 114. The shaft 42 is held against axial movement relative to sleeve 130 by means of the integral shoulder 144, formed thereon, abutting an annular collar 140 secured to the upper end of a sleeve 130 by screws 146. An O ring seal 142 is provided in a groove 143 adjacent the shoulder 144 and prevents escape of fluid from the outlet passage 48 between shaft 42 and sleeve 130. Referring to Figure 4, as shaft 42 is rotated in a clockwise direction, the initial movement of lever 138 will depress pilot valve stem 108 against the combined pressures of spring 116 and fluid acting against pilot valve 112, to unseat valve 112. Continued rotation of shaft 42 will cause lever 138 to completely compress spring 116 and unseat the main valve assembly 117 against the pressure of spring 126.

When the valve assembly is in closed position, a pressure differential will exist between the inlet passage 46 and the outlet passage 48 which tends to maintain the main valve in its closed position. As previously pointed out, passages 80 and bleed orifices 82 respectively connect the chambers 76 and 78 to inlet passage 46, and will eliminate static pressure differential across plunger 70. Therefore, when the main valve 117 is in its closed position, the chamber 78 and all passages communicating therewith will be under the same pressure as that existing in inlet passage 46 i. e., line pressure. As explained, the lever 138, in its initial opening movement, will unseat pilot valve 112 against the pressure existing in chamber 78. However, since the pilot valve 112 is of a relatively small area, the total force acting against it by reason of the fluid pressure in chamber 78 is relatively small. As soon as the pilot valve member 112 is unseated, the outlet passage 48 is connected with the chamber 78 through passages 98, 90, 104 and counterbore 106, thereby quickly reducing the pressure in chamber 78 to the pressure of the outlet passage 48. Because of the restricted orifice bleeds 82, a considerable time interval will occur before the pressure in chamber 78 can increase to equal that in inlet passage 46. During this interval, there will be fluid pressure from the inlet chamber exerted through unrestricted passages 80 against the top of piston 70 tending to open the main valve. The fluid under pressure in the inlet chamber 46 also acts against the bottom of the valve plate 124, tending to maintain the main valve in a closed position. Since the area of piston 70 is slightly greater than the area of plate 124, and equal pressures are acting against both, a resultant force tending to open the main valve is available during this interval to counterbalance the effect of spring 126, thereby enabling a practically effortless initial opening of the valve.

An operating handle 132 and lever arm 43 are removably mounted on the splined outer end of shaft 42. One end of latch rod 41 is pivotally connected to the free end of lever arm 43 as by a clevis and pin arrangement 150. The opposite end of rod 41 is pivoted to a latch bar 152 as by another clevis and pin arrangement indicated at 154 on Figure 1. The shaft 42 is thus connected with the mechanism of latch box 35 by means of lever arm 43, rod 41 and latch bar 152, and reciprocation of latch bar 152 will directly control opening and closing of the valve assembly.

Latch box mechanism

The latch box mechanism is indicated generally by the numeral 35 in Figure 2 and its internal mechanism is best shown in Figures 6–20. The latch box assembly 35 is made up of a base section 155 having a circular side wall 156 and transverse wall 158 which has a central circular opening 160 concentric with side wall 156. Within the base section adjacent to opening 160, a latching lever 162 of planar form is pivotally mounted at one end on a stud 164 fixed in transverse wall 158. Lever 162 lies and pivots in a plane parallel with and closely adjacent to transverse wall 158 and terminates at its pivoted end in a short angularly disposed arm 166 projecting outwardly from the pivot stud 164 towards the cylindrical body wall 156 for a purpose to be described. The other end of lever 162 is indicated at 167 and is curved to extend from the stud 164 around one side of opening 160. End 167 of the lever is slidably guided by a plate 168 projecting radially inward over said lever from the cylindrical wall and substantially in diametrical alignment with the pivot stud 164 and fastened by a screw to an integral boss 169 on the transverse wall 158. Adjacent one side of guide plate 168, the transverse wall 158 of the casing is provided with an aperture 170 over which the end 167 of lever 162 partially extends when said lever is in the position shown in Figure 6 of the drawings corresponding to a latched valve open position. Fixed in the lever adjacent the pivot stud 164 and at the opposite side thereof with respect to the lever arm 166 is a stud 172 carrying a latching roll 174 for cooperation with the latch 152 in the manner described below.

The rectangular latch bar 152 is slidably guided in notches or recesses 176 in the cylindrical body wall 156 of the base section for movement in a path substantially normal to the pivot axis of lever 162. Notches 176 are of such a depth as to support the bar 152 above the transverse wall 158 in vertical spaced relationship thereto and bar 152 is retained in said notches by a latch box cover plate 178 (Figure 7) secured to the base section by means of screws 180 threaded into bosses 182 which extend radially inward from the side wall 156. A pin 184 (Figures 6 and 8) extends from the bottom of latch bar 152 and coacts in abutting relation with the short lever arm 166 when bar 152 is moved to the right to rock latch lever 162 in a clockwise direction. A second pin 185 is fixed to bar 152 externally of the latch box for limiting its movement to the left, by contacting wall 158.

In suitably spaced relation from the pin 184, a notch or recess 186 is formed in the inner face of bar 152. Also formed in the inner face of bar 152, adjacent to notch 186, are camming surfaces 188 and 190, the surface 188 being joined with the recess 186 by means of a bevel surface 192 while the surfaces 188 and 190 are joined together by bevel surface 194. These surfaces and notch 186 are positioned relative to the pin 184 to receive the latch lever roller 174 in an abutting relation as the latch bar 152 moves to the right during valve opening movement.

Figures 6, 7, 8, 9, 10, 11:
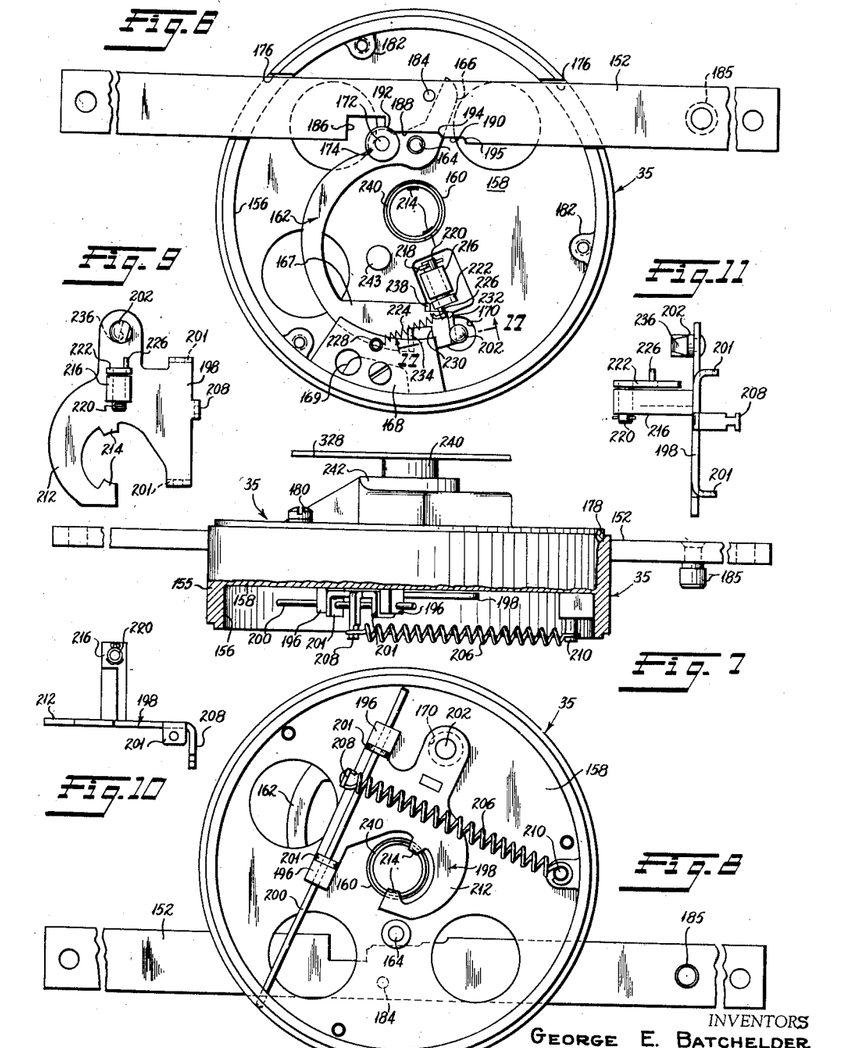
Figure 6 is a top plan view of the latch box with the cover plate removed.
Figure 7 is an elevation view of the latch box shown in Figure 6 with a portion thereof cut away and the cover plate attached.
Figure 8 is a bottom view of the latch box shown in Figure 6.
Figures 9, 10 and 11 are top plan, rear elevation and side elevation views respectively of the latch release plate.
Figure 12:
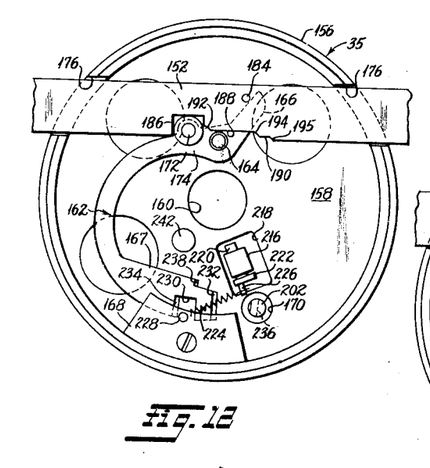
Figures 12, 13, 14 and 15 are top plan views of the latch bar, latch lever and release assembly showing their relative positions during the stages of latching and releasing.
Figure 13:
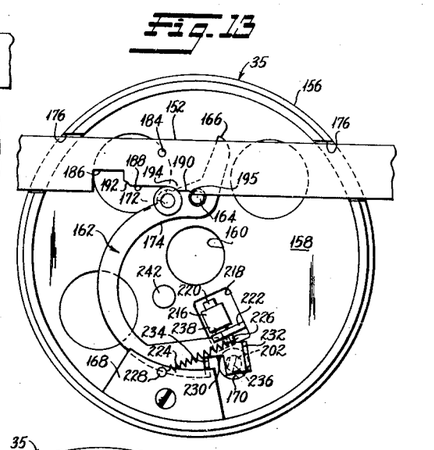

Referring to Figure 8, two integral bosses 196 depend from the bottom of wall 158. Coaxial holes are drilled in bosses 196 to carry a rod 200. A latch release plate 198 having spaced apertured ears 201 is rockably mounted thereby on rod 200 between bosses 196. Spaced from said rod 200, latch release plate 198 carries an upstanding pin 202 that projects through aperture 170 in the wall 158 of the casing to coact with the end 167 of lever 162 as will presently appear. The plate 198 is biased toward wall 158 by a spring 206 attached to a lug 208 on the plate 198 opposite the pivot line from pin 202. The other end of the spring is anchored to the casing wall at 210 to normally hold the plate 198 flat against the bottom of wall 158 with the pin 202 projecting through aperture 170 and extending above the upper surface of said wall.

A curved arm 212 on plate 198 extends around one side of the opening 160 in the wall 158 and has spaced lugs 214 on the inner edge projecting inwardly over said opening. It will be evident that the spring 206 constantly urges the pin 202 upwardly into engagement with the end of lever 162 or against its bottom surface, depending on the relative position of lever 162.

As best shown in Figures 6 and 9–15, a rectangular post 216 is also rigidly mounted on the upper side of plate 198 at a point directly above spring 206 and projects through a rectangular aperture 218 in the transverse wall 158. Pivoted to the upper portion of this post by means of a pivot pin 220 is a lock arm 222 which is trapezoidal in shape, the nose section of which extends partially into the opening 218. The nose section of lockarm 222 is normally urged into contact with one side of opening 218 by means of a spring 224 (Figure 6) extending between a pin 226 on arm 222 and pin 228 on guide plate 168.

Referring to Figures 17–20 the pivot pin 220 of lock arm 222 is positioned relative to the end of arm 222 so the arm 222 may swing and clear the right hand side wall of opening 218 when plate 198 is abutting the underside of transverse wall 158, however, if plate 198 is depressed against the bias of spring 206, post 216 carrying lock arm 222 will be moved downwardly a slight distance through opening 218 and the swinging movement of arm 222 will then be limited by engagement with the side wall of opening 218.

Figure 16:
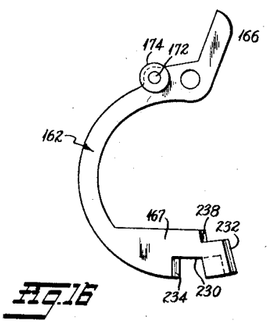
Figure 16 is a top plan view of the latch lever.
Figure 17:
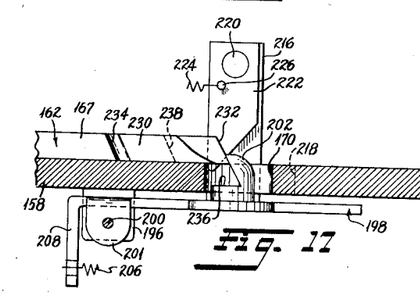
Figure 17 is a view of a section taken along lines 17—17 of Figure 6 showing details of the latch lever stop means.
Figure 18:
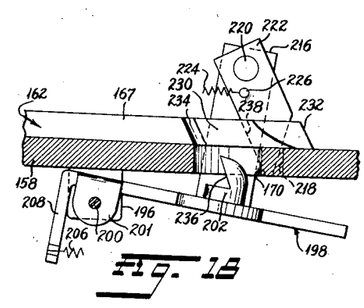
Figures 18, 19 and 20 are views similar to Figure 17 showing the latch lever and stop means during the various stages of latch lever escapement.

Formed on the extreme end of lever 162, Figures 6 and 16, diametrically opposite from the pivot pin 164 is an inclined surface 232 and suitably spaced therefrom along the outer periphery of lever 162 is a recess 230 having a similar inclined surface 234. As shown in Figure 9, the pin 202 has a notch 236 formed to receive the surfaces 232 or 234 when the pin 202 extends above the wall 158. A further inclined surface 238 (Figures 6 and 16) is formed on the inner periphery of the lever arm 162 near the surface 232 but suitably spaced rearwardly therefrom. As the lever 162 is pivoted clockwise about stud 164 by the previously mentioned coaction with latch bar 152, the surfaces 232 and 234 are successively moved past the nose down into the aperture 218. Further movement of the bar 152 to the right, Figure 12, will move the inclined section of the arm 222 allowing the arm 222 to hang surface 232 on the end of lever 162 away from opening 170 and out of contact with pin 202, allowing the spring 206 to urge pin 202 up into the path of the end of lever arm 162. At approximately the same time, the roller 174 on the lever 162 moves over beveled surface 192 and into recess 186. Spring 206 then acts to rock plate 198 on the rod 204 and positions the notch 236 on pin 202 adjacent the end of lever 162. At this point the valve is in a fully opened position and when the operator releases manual control, the valve spring tends to close the valve and biases latch bar 152 to the left (Figure 6), biasing latch lever 162 counterclockwise to engage the end 232 in the notch 236 of pin 202 thereby securely latching said lever and bar 152 in set position against the action of spring 126 of valve 38. As shown in Figure 6, the surface 232 is beveled to fit securely into beveled notch 236 to prevent accidental release.

For the purpose of tripping the pin 202, a tube 240 is loosely disposed through a central opening in a boss 242 integrally formed on the cover 178 as shown in Figure 7. Tube 240 projects through central opening 160 in wall 158 where it is supported upon the lugs 214 of the plate 198. As shown in Figures 1 and 2, the latch box assembly is clamped between the base plate 33 and the upper surface of housing 31 in such a position that the bar 152 is angularly disposed with respect to the axis of the meter for attachment with rod 41 by means of the clevis 154. As viewed in Figure 1, the spring 126 of valve unit 40 will tend to rotate shaft 42 in a counterclockwise direction when the valve has been latched in its open position. Therefore, when the valve has been latched in its open position, the bar 152 is urged in the direction away from the meter in Figure 1 and to the left in Figure 6 and the beveled surface 192 on bar 152 abuts against roller 174, tending to urge the lever 162 in a counterclockwise direction about its pivot stud 164. Lever 162 is held in the position shown in Figures 5 and 8 by the engagement of the end surface 232 with notch 236.

The latch box mechanism is tripped to allow movement of the bar 152 to the left in Figure 6 (valve closing direction) in the first of three successive stages by depressing the tube 240. Depressing tube 240 will rock plate 198 about the axis of rod 200, Figure 18, thereby disengaging pin 202 from surface 232 on lever 162, allowing lever 162 to pivot counterclockwise about pin 164. When lever 162 is free of restraint, bar 152 will move to the left because of the biasing action of the valve spring, roller 174 will ride up out of engagement with beveled surface 192 on to surface 188, causing the lever 162 to pivot in a counterclockwise direction until a point has been reached in its pivotal motion, Figures 13 and 18 where the inclined surface 238 contacts the nose portion of lock arm 222, causing it to pivot about pin 220, until the angular surface of the lock arm 222 engages the right-hand wall of opening 218, as viewed in Figure 18. At this point, the lever 162 will be held against further pivotal movement and the bar 152 will have completed its initial stage of closing movement to the left. The roller 172 will now bear against bevel surface 194 and prevent further movement of bar 152. At the end of the first stage of movement of lever 162, recess 230 is positioned directly above opening 170 and pin 202; however, as long as tube 240 is depressed plate 198 is rocked away from the wall 158 and pin 202 can not extend through recess 230.

Figure 14:
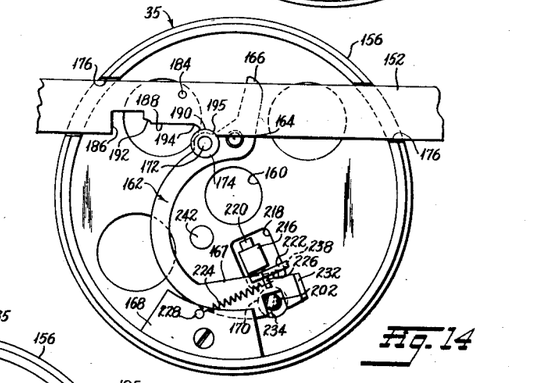
Figure 19:
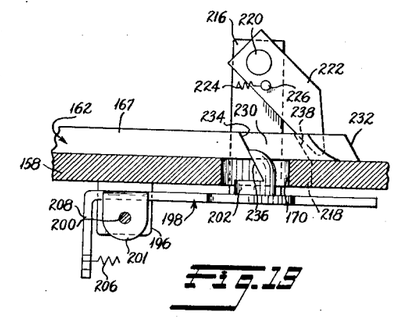

The second stage of movement, see Figures 14 and 19 is initiated by releasing tube 240 from its depressed position, thus allowing plate 198 to rock about the shaft 204 moving post 216 and lock arm 222 upwardly in opening 218 until the angular surface of lock arm 222 is disengaged from the right side of opening 218. At the same time, pin 202 is moved upwardly through opening 170 to extend into recess 230 in lever 162. The bevel surface 194 on bar 152 bears against roller 174, urging the surface 238 against the arm 222 and when lock arm 222 is free of engagement with the side of opening 218, it pivots about pin 220 against the pressure of spring 224, allowing further clockwise motion of the lever 162 until surface 234 is engaged in notch 236 of pin 202 as shown in Figure 14. At the same time, roller 174 will have ridden up on to the surface 190 into abutting engagement with bevel surface 195, at which point bar 152 will have completed its second stage of movement to the left.

Figure 15:
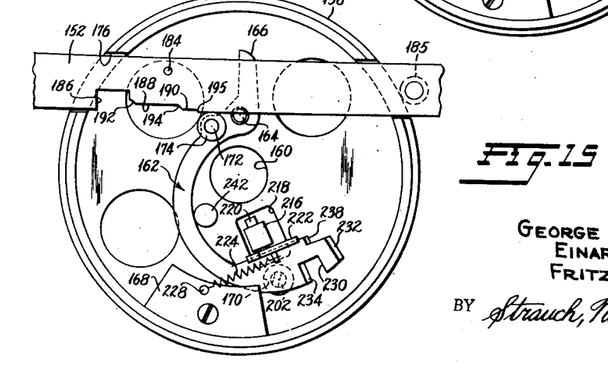
Figure 20:
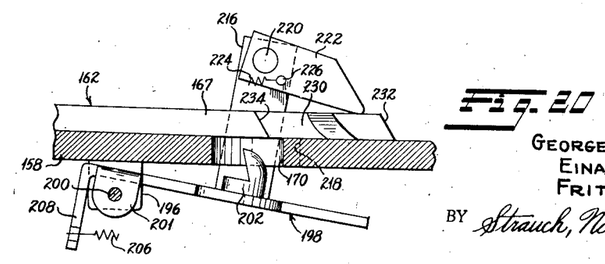

The third stage of movement of the bar is caused by again depressing tube 240, Figure 20, to rock plate 198 against the pressure of spring 206 to disengage pin 202 from surface 234 on lever 162. Lever 162 is now free to complete its counterclockwise movement about pin 164, as shown in Figure 15, allowing bar 152 to complete its third and last stage of movement to the left, thereby completely closing the main valve and the pilot valve. At this position lever 162 abuts a limit pin 243 in transverse wall 158 to prevent any further unnecessary movement.

As will be understood, the latch release plate 198 carrying the pin 202, post 216, and lock arm 222 constitutes an escapement mechanism for biased latch lever 162, actuated by rocking the plate 198 by means of tube 240, and by merely incorporating additional staggered surfaces similar to 232, 234 and 238 on the latch lever 162, additional escapement steps may be realized.

*Predetermining register*

The means by which the latch box mechanism just described is tripped to permit successive three-stage movement of the bar 152 and closing of the valve will now be described. The details of the predetermining register are shown in Figures 21–26.

The predetermining register unit 37 has a series of digit wheels 250, 250', 250" and 251 mounted in a suitable frame 252 within a housing 254 and provided with a manually operable shaft 256 for setting said wheels. A gear train now to be described, is mounted in the frame 252 and transmits the drive to the digit wheels from shaft 258 which is in turn coupled with the meter drive shaft 32, as shown in Figure 3. Gear 260, mounted on the shaft 258, meshes with gear 262 which is non-rotatably fixed to shaft 264 (Figure 22), vertically mounted for rotation in frame 252. Vertically spaced above the gear 262 (Figure 21) and mounted for rotation with shaft 264 is a worm 266. A pinion gear 268 and a worm gear 270 are mounted on frame 252 for rotation together on a horizontal axis, the worm gear 270 meshing with and being driven by worm 266 while gear 268 meshes with and drives gear 272 similarly mounted on frame 252 for rotation on a horizontal axis. The unit wheel 251 is driven directly by gear 272 meshing with a gear 274 which drives the unit digit wheel by means of a conventional clutch arrangement (not shown). All the digit wheels can be selectively engaged by the shaft 256 through a one-way clutch (not shown) to rotate the wheels in a counterclockwise direction, as viewed from the left in Figure 21, to preset any desired total on the wheels. Rearwardly of shaft 256 and vertically spaced therefrom is a shaft 276, mounted in the frame 252, which carries transfer pinions 278 by which the other wheels 250, 250' and 250" are progressively moved in descending order in a ten-to-one ratio in a manner well known in the art. In the present instance, four digit wheels are shown but a greater or less number may be used as desired.

Rearwardly of and parallel to shaft 276, a shaft 280 is journalled in frame 252 and has pivotally mounted thereon a weighted arm 282. Rigidly secured to the right leg 283 of weighted arm 282 (Figure 21), for rotation therewith, is a bracket 284 and between said bracket and frame 252, a carrier member 286 is pinned to shaft 280 by means of pin 288. A collar 292 is also pinned to the shaft 280 between the legs of the weight 282 constituting an abutment for a spring 290 compressed between the said collar and the right leg of the weight to urge the weight 282 and bracket 284 against the sleeve and collar member 286.

Figure 21:
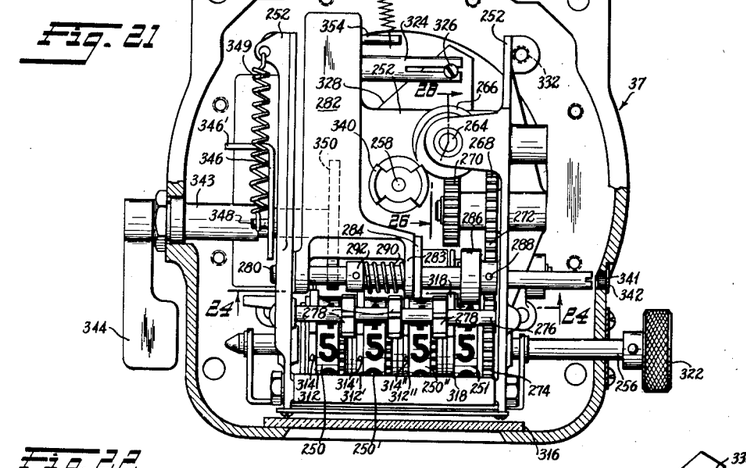
Figure 21 is a top plan view of the predetermining register mechanism and the housing therefor taken along the lines 21—21 of Figure 1.
Figure 24:
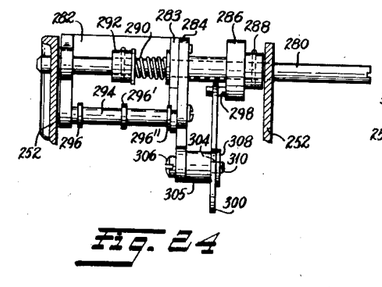
Figure 24 is a detail section, taken on line 24—24 of Figure 21, showing the weight actuating means and the cut-off point calibrating mechanism.
Figure 25:
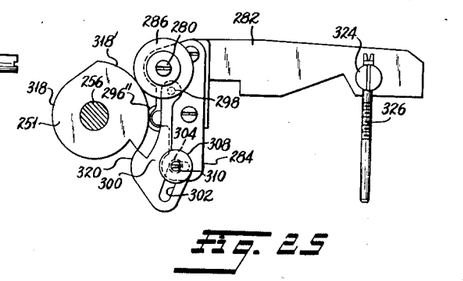
Figure 25 is a side elevation of the mechanism shown in Figure 24, as viewed from the right in Figure 22.
Figure 26:
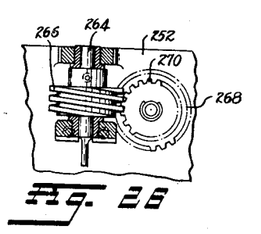
Figure 26 is a vertical section taken along the lines 26—26 of Figure 21.

Figure 24 is a view of the weight actuating means taken along the lines 24—24 of Figure 21. Rod 294 is rigidly mounted between one leg of the weight 280 and the bracket 284, in a position directly beneath the shaft 280. Rod 294 has formed thereon three spaced circular cam followers 296, 296' and 296" which, as will be explained, coact with the digit wheels to allow sequential pivotal movement of the weight 282, thereby tripping the latch box mechanism previously described. As best shown in Figures 24 and 25, a pin 298 protrudes inwardly from the marginal portion of carrier element 286. One end of a trip arm 300 is loosely pivoted to the pin 298. The other end of trip arm 300 is enlarged, as shown in Figure 25, and has a slot 302, which slot is guided on a guide pin 304 on the end of post 305. Post 305 is rigidly secured to the extreme lower end of bracket 284 by any suitable means such as screw 306. Trip arm 300 is maintained in proper vertical alignment by means of the shoulder of pin 304, washer 308 and screw 310. It will be noted that as the collar 286 is rotated with the shaft 280, the trip arm 300 will be moved up and down in a vertical direction by means of the pin 298 and will be guided in its vertical movement by the pin 304 riding in slot 302.

Three of the digit wheels, 250, 250' and 250", have integrally formed therewith, coaxial circular cams 312, 312' and 312" (Figure 21) into which are milled respective depressions or notches 314, 314' and 314". The notches are formed adjacent the numeral "5" in each case so that they will all be in alignment with each other and directly opposite the cam follower 296 when wheels 250, 250' and 250" present the numeral "0" to the window 316 in housing 254. Unit digit wheel 251 (Figure 25) has integrally formed therewith a cam 318 having a raised portion 318' which extends along the periphery of wheel 251 from the numbers "7"–"5" inclusive and drops off abruptly at end of number "5."

Figures 22, 23:
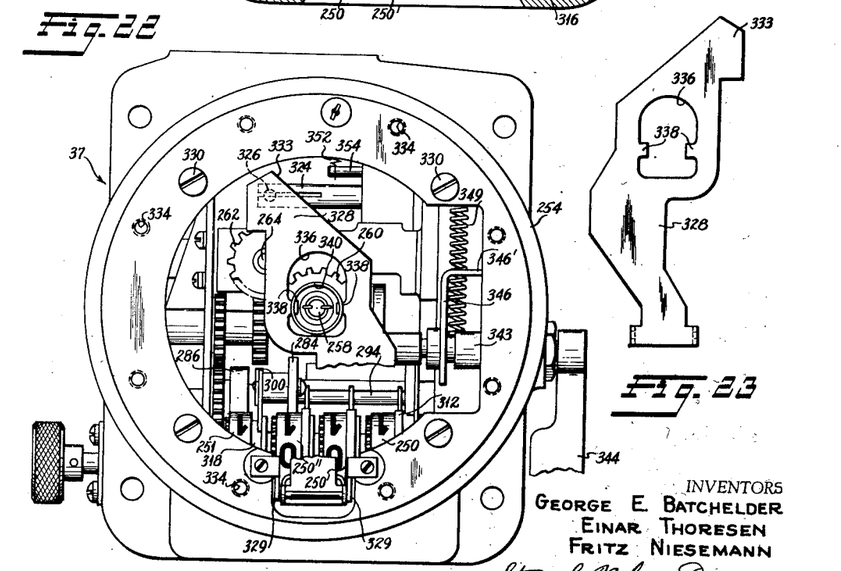
Figure 22 is a bottom plan view of the predetermining register shown in Figure 21 and looking in a direction opposite from that viewed in Figure 21.
Figure 23 is a top plan view of the register trip plate.

Formed on the enlarged portion of trip arm 300 opposite slot 302 is a nose portion 320. As best seen in Figures 22 and 25, the trip arm 300 depends from the carrier 286 in such a position that the nose portion 320 will, during a portion of each revolution of digit wheel 251, ride up on the raised portion 318' of the cam 318 and by means of its linkage with weight 282 through the pin 304, slot 302 and bracket 284, will cause the weight 282 to pivot about the shaft 280 in a counterclockwise direction, as viewed in Figure 25, and thereby move the rear portion of the weight 282 upwardly, as viewed in Figures 21 and 25. As the unit digit wheel 251 continues to rotate in the counterclockwise direction, the nose portion 320 of the trip arm 300 will be disengaged from the raised portion 318' and will drop down to the circular periphery of the cam 318 under the influence of the weight 282, thereby allowing the tail portion of the weight 282 to move downwardly, as viewed in Figures 21 and 25.

Extending from the side of the extended portion of weight arm 282, and integral therewith, is a horizontal bar 324. As shown in Figure 22, the front end of a trip plate 328 is pivoted to a web 329 at the front lower portion of housing 254. The trip plate is thus mounted beneath the frame 252 for limited vertical rotation about a horizontal axis. A pin 326 depends from the end of bar 324 and, when the frame 252 is secured within the housing 254 by means of screws 330 extending upwardly through a circular web in housing 254 and into threaded holes 332 on frame 252, pin 326 will be positioned directly above the rear portion 333 of pivoted plate 328.

The weighted member 282 or the assembly of the pivotally mounted weighted member with associated components such as cam followers 296, 296' and 296", trip arm 300, bar 324 and pin 326 which are secured to and pivot with the weighted member constitutes a shiftable operator which will transfer condition indicia from the register mechanism to the latch mechanism.

Referring to Figures 2 and 22, the register housing 37 is mounted in the general assembly by first mounting base plate 33 on the latch box assembly 35 and clamping the said latch box between the plate 33 and the top of housing 31 by means of eight equally spaced screws and spacers 34 which are threaded into the top of the housing 31. Register housing 37 is secured on top of base plate 33 by means of screws 36 which project upwardly through the base plate 33 and are threaded into eight equally spaced holes 334 tapped in the web portion of housing 254 (Figure 22). When so mounted, trip plate 328 is directly over and rests on tube 240 (Figure 7). The plate 328 has a central opening 336 into which project ears 338, which are adapted to contact tube 240. Shaft 258 extends through tube 240 within the latch box 35, through opening 336 in plate 328 and by means of a coupling 340, drives a totalizing register 38 mounted on top of predetermining register 37 by suitable means not shown. Register 38 will record the total amount of fluid through the meter 30 and has no effect on the operation of predetermining register 37, latch box 35 or valve unit 40.

*Operating cycle*

The particular mechanism described in the foregoing is adapted to begin closing movement of the valve 117 when all but 10 gallons of the desired predetermined quantity of fluid remains to be metered and dispensed. It is to be understood, however, that by suitable placement of the recesses 314, 314', 314'' and the cam portion 318', the first or initial stage of the valve closing movement could be initiated at any desired figure within the range of the predetermining register. Assuming that it is desired to dispense 100 gallons of fluid and then close the valve to further flow, the numeral "100" is set up on the digit wheels 250', 250'' and 251 by means of the knurled knob 322. The operating handle 132 is grasped and rotated in a clockwise direction, as viewed in Figure 1, to open valve unit 40, as explained above. The initial clockwise rotation of shaft 42 will first open pilot valve 112, thereby fluid pressure balancing both sides of main valve 117. Further clockwise rotation of shaft 42 to fully open the main valve 117 is resisted only by spring 126. As shaft 42 is rotated in a clockwise direction to fully open the valve, latch bar 152 is pulled toward the meter 30, or to the right in Figure 6, and when the valve is in its full open position, bar 152 is latched in position against the pressure of spring 126 by the engagement of pin 202 with the end of latch lever 162 (Figure 6).

Valve unit 40 now being latched in its full open position, fluid will flow through the meter 30 driving the shaft 258. Through the train of gears 260, 262, worm 266, worm gear 270, gears 268, 272 and 274, Figures 3, 22 and 26 the digit wheels are driven to register progressively decreasing amounts by means of the transfer pinions 278 in a manner well known in the art. When a point is reached where 10 gallons of the desired predetermined quantity remains to be dispensed, digit wheels 250, 250' and 251 will show the numeral "0" through the window 316, while the digit wheel 250'' will show the numeral "1." The recesses 314 and 314' are in alignment and respectively opposite the circular cam followers 296 and 296'. However, since, at this point, the recess 314'' is not in alignment with the recesses 314 and 314', the cam follower 296'' rides on the periphery of cam 312'', thereby maintaining the rear portion of weight 282 in a relatively elevated position to hold pin 326 out of contact with trip plate 328. However, as one more gallon is dispensed through the meter, the digit wheel 251 will register the numeral "9" and the digit wheel 250'' will register the numeral "0," thereby bringing the recess 314'' into alignment with the recesses on the other digit wheels and to a position directly opposite the cam follower 296''. Since, as explained above, the raised portion 318' extends only from the numeral "7"–"5" inclusive, of the digit wheel 251, the nose portion 320 will be opposite the peripheral surface of the cam 318. At this point, cam followers 296, 296' and 296'' will drop into recesses 314, 314' and 314'' and nose portion 320 of arm 300 will be swung into contact with the cam 318, allowing the weight 282 to pivot about shaft 280, causing pin 326 to depress plate 328 which in turn depresses tube 240. As explained above, when tube 240 is initially depressed, pin 202 (Figure 6) is disengaged from the end of latch lever 162 and bar 152 is allowed to move to the left under the influence of spring 126 (Figure 4) until the surface 238 on lever 162 engages the nose portion of arm 222, whereupon arm 222 is pivoted until its inclined surface abuts against the wall of opening 218 at which point latch bar 152 is held against further movement to the left to latch the valve 40 in its first stage of partially closed position. Further flow of fluid through the meter 30 at a reduced rate will now continue until the numeral "3" on digit wheel 251 is brought into register through the window 316. At this point, the nose portion 320 of trip arm 300 will be engaged by the raised portion 318', causing weight 282 to pivot in a counterclockwise direction about shaft 280, as viewed in Figures 21 and 25, thus raising the extended portion of weight 282. Raising the extended portion of weight 282 removes pin 326 from contact with plate 328, which in turn releases tube 240, allowing the plate 198 (Figure 19) to rock about shaft 204 under the influence of spring 206, thereby disengaging the inclined surface of arm 222 from the wall of opening 218 and projecting pin 202 into recess 230 of arm 162. When arm 222 is disengaged from the wall of opening 218, the latch arm 162 is released for further pivotal motion about pivot pin 164 until the inclined surface 234 is engaged by pin 202. This further pivotal motion of latch arm 162 allows the latch bar 152 to move to the left (Figure 14), thereby completing the second stage of closing movement of the valve 40.

Continued flow of fluid through the meter 30 at a further reduced rate will take place until the numeral "0" on digit wheel 251 appears in register through window 316 at which point all of the predetermined quantity of fluid has been dispensed. At this point, the wheel 251 has been rotated to the position shown in Figure 25 and arm 300 drops down off of the raised cam portion 318' on to the periphery of cam 318, allowing weight 282 to rock in a clockwise direction, as viewed in Figure 25, about shaft 280. The pin 326 again depresses plate 328 which in turn again depresses tube 240 to disengage pin 202 from the inclined surface 234 on latch lever 162 (Figure 20). The latch lever 162 is then free to pivot about pin 164, thereby allowing bar 152 to move to the left (Figure 15) an amount sufficient to completely close the valve unit 40, thus preventing further flow through the meter 30.

In order to precisely adjust the point where the nose portion 320 of arm 300 is disengaged from the raised cam portion 318' to initiate first and third stages of valve closure, the vertical position of arm 300 may be varied with respect to the digit wheel 251 by means of the mechanism shown in Figures 24 and 25. This adjustment is accomplished by rotating the shaft 280 and carrier 286. Arm 300 depending from pin 298 will thereby be moved vertically with respect to the axis of shaft 256, and guided by pin 304 in the slot 302. Since the engagement between trip arm nose portion 320 and cam 318 determines all three stages of valve closure, it will be appreciated that the described adjustment of arm will vary the precise points in the revolution of digit wheel 251 where the nose portion 320 is engaged and disengaged by raised portion 318', thus providing a means to adjust the three-stage cut-off range with relation to total quantity. Shaft 280 is accessible from the outside of housing 254 by means of an opening 341 through which a screw driver may be inserted to engage a slot in the end of shaft 280. Opening 341 is normally closed by a plug 342.

In case it is desired to close the valve unit 40 before the predetermined quantity has been dispensed, a manually operable emergency trip means has been provided, as best shown in Figures 21 and 22. A shaft 343 is journalled in the side wall of housing 254 to the outer end of which is secured a manually operable lever 344. The shaft 343 extends through an opening in the frame 252 and attached to the inner end thereof is a trip lever 350, said lever being positioned beneath the weight 282 and directly above trip plate 328. Intermediate its ends and closely adjacent to the outside of frame 252, a stop arm 346 is non-rotatably secured to the shaft 342. Stop arm 346 is L-shaped in form and has a leg 346' extending from one end and a pin 348 rigidly secured to its opposite end. A spring 349 extends between the pin 348 and the frame 252 to normally urge the leg 346' into engagement with a bottom web integrally formed on housing 254. As the shaft 343 is rotated against the pressure of spring 349 by depressing lever 344, the trip lever 350 will depress plate 328 to actuate the latch box mechanism. To manually actuate the tripping mechanism to close the valve, it is simply necessary to depress lever 344, thus depressing the tube 240 and the valve will close its initial step, as above described in connection with the automatic operation. When lever 344 is released, spring 349 will rotate the shaft 343 until arm 346' abuts against housing 254.

This releases tube 240 to complete the second stage closing of the valve. The third and final stage closing of the valve is initiated by again depressing the lever 344.

If desired, the weighted arm 282 may be biased downwardly by a spring 352 extending between a pin 354 on arm 282 and the frame 252. However, the weighted arm 282, will normally be effective to trip the latch lever holding pin 202.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a fluid meter, a register driven by said meter, a valve assembly controlling flow of fluid through said meter comprising a main valve and a pilot valve, control mechanism including a latching device and a latch release member interconnecting the register and valve assembly, means to open said pilot valve and main valve in timed relation and to actuate said control mechanism into a latched position when the main valve is opened, means for setting said register to render it succsessively responsive to the passage of predetermined quantities of fluid through said meter to actuate said latch release member a plurality of times, and means in said control mechanism, including the latching device, being responsive to each actuation of said latch release member by said register to effect a positive closing step of said main valve.

2. A combination as set forth in claim 1 wherein said valve assembly includes a fluid pressure balancing means effective during valve opening movement.

3. In a predetermining liquid dispensing apparatus, a liquid meter; a valve assembly connected in fluid flow relation with said meter; control mechanism for opening and closing said valve assembly; a register driven by said meter having a shiftable operator movable between a first and a second position and adapted to coact with said control mechanism; means for actuating said control mechanism to open the valve assembly; means to set the operator in said first position; means responsive to movement of the operator to the first position for latching the control mechanism in a first position; means in the register responsive to passage of a first predetermined quantity of fluid through the valve assembly to move the operator to its said second position; means responsive to movement of the operator to its said second position to unlatch, move and relatch the control mechanism to and in a second position whereby the valve assembly is moved one step toward closed position; means responsive to passage of a second predetermined quantity of fluid through the valve assembly to move the operator back to said first position; means responsive to movement of the operator back to said first position to unlatch, move and relatch said control mechanism to and in a third position whereby the valve assembly is moved one more step toward closed position; means responsive to passage of a third predetermined quantity of fluid through the valve assembly to move the operator back to said second position; means responsive to the movement of the operator back to said second position to unlatch and move said control mechanism to a fourth position whereby the valve assembly is fully closed.

4. In a predetermining apparatus as set forth in claim 3 said valve assembly comprising a main valve and a pilot valve and wherein said control mechanism coacts with said valve assembly when actuated to open the latter to first open the pilot valve to balance fluid pressure on said main valve and then opening the main valve, and during movement of said control mechanism from its third position to its fourth position to first seat the main valve in closed position and thereafter seat the pilot valve in closed position.

5. In a predetermining dispensing apparatus: a fluid meter; a flow control valve connected thereto and providing a controlled passage for fluid passing through said meter including means biasing the valve toward a closed position and fluid pressure balancing means to enable ease of operation to an open position; means in structural cooperation with said valve assembly for operating said valve including a manual means to position said valve in the open position; a latch means adapted to structurally cooperate with and operable to successively hold said operating means in a valve full open position and two valve partially open positions and operable when said operating means is unlatched from the valve full open position and the first valve partially open position to relatch said operating means in the next adjacent valve partially opened position; and a flow registering means connected to said meter and including means shifted back and forth between two positions at least three successive shifts from one position to the other in accordance with predetermined components of fluid flow through said meter, said shiftable means being adapted to structurally cooperate with said latching means and operable to unlatch said latching means each time said shiftable means shifts from one position to the other.

6. A predetermining apparatus for liquid meter assemblies comprising: a liquid meter; a liquid flow control valve connected thereto; a register mounted on and driven by the meter; means biasing said valve to a closed position; trippable latch mechanism, including a shiftable means movable between two positions, for retaining said valve in fully opened and partially opened positions against the action of said biasing means, tripped by movement of said shiftable means from either of said two positions to the other position, operable at least twice, when successively tripped by movement of said shiftable means from one of said positions to the other position and back to the first position, to reset itself after each tripping action to hold the valve in successive partially opened positions, and operable during a final tripping action to allow the valve to fully close; register actuated means responsive to increments of flow through the meter structurally associated with said shiftable means for controlling movement of said shiftable means at least three successive times; and means operatively connected between the valve and the latch mechanism manually operable for setting said latch mechanism and valve in fully open position.

7. Apparatus as set forth in claim 6 wherein said latch mechanism comprises reciprocable means having two latching elements adapted to successively alternately engage with and hold said operatively connected means in at least three positions corresponding to three valve open positions.

8. Apparatus as set forth in claim 6 wherein said register actuated trip means includes a pivoted arm; means cooperating between the arm and said register to enable at least three movements of said arm about its pivot during predetermined increments of flow through said meter; and means adapted to coact with said shiftable means to trip said latch mechanism each time the arm is moved.

9. Apparatus as set forth in claim 8 wherein said pivoted arm is weighted; and the means cooperating between the arm and said register includes a plurality of cams on said register movable in accord with increments of flow through the meter, and a plurality of cam followers on said arm cooperating with said cams to enable said weighted arm to lower and also to raise said arm in accord with cam positions.

10. Apparatus as set forth in claim 8 wherein said means adapted to cooperate with said shiftable means comprises a reciprocable device coacting with said latch mechanism shiftable means and adapted to be reciprocated by movement of said arm.

11. A predetermining apparatus for fluid meters comprising a fluid control valve assembly including a pilot valve and a main valve; actuating means operably connected with said valve assembly manually operable to successively open the pilot valve and the main valve; a spring in said valve assembly energized by opening of said valves to bias said main valve toward a closed position; means for latching said valve assembly in full and partly opened positions comprising a bar having a plurality of cammed portions along its length, a pivoted latch lever adapted to be engaged by said bar and biased by movement of said bar into latching engagement with a one of said cam portions and including, adjacent one end thereof, a plurality of staggered shoulder portions; and trip means operable in response to increments of fluid flow through the meter to successively engage each of said staggered shoulders to permit staged movement of said latch lever out of engagement with one of said cammed portions and into engagement with an adjacent cam portion of said bar to thus permit a staged closing of said main valve.

12. Predetermining dispensing apparatus comprising: a fluid meter; a flow control valve assembly connected thereto and including means biasing said assembly toward a closed position; means for actuating said valve assembly including a manual means to position said valve assembly in the opened position; means operative by movement of said valve actuating means to open position to retain said actuating means in a valve open position, including a pivoted latch lever biased in one direction by said biased valve and a latching assembly cooperating with the latch lever to prevent movement in said one direction; a flow registering mechanism connected to said meter and operable to actuate, release and reactuate said latching assembly at least once in accordance with predetermined components of fluid flow through said meter, said latching assembly cooperating with said latch lever to release and relatch said latch lever during said first actuation by said registering mechanism, to again release and relatch said latch lever during said release by said registering mechanism and to release said latch lever during said reactuation by said registering mechanism whereby said latch lever permits the valve to move to a closed position in a plurality of staged movements.

13. A predetermining dispensing apparatus as set forth in claim 12 wherein: said latching assembly includes two elements adapted to alternately engage said pivoted latch lever to permit said release and relatch of said latch lever.

14. A latch box mechanism connected between a fluid meter, a predetermining register and a flow control valve for latching said valve in the open position and progressively closing said valve in accordance with predetermined components of fluid flow through the meter as determined by said register comprising: means connected with said valve and movable between two limit positions in said latch box mechanism; a first mechanism pivoted in said latch box and engaged by said first named means to swing into locking engagement with said first named means when said first named means is moved to one of said limit positions; movably mounted spring biased latching mechanism automatically cooperating with said first mechanism to latch said first mechanism and hold said first named means in said one limit position; second means cooperating with said predetermined register and responsive to a component of fluid flow through said meter to move said latching mechanism to a second position whereby said first mechanism may be repositioned to release engagement with said first named means and reengage and hold said first named means at an intermediate position between said limit positions; said second means being operable, after an additional component of fluid flow, to release and enable return of said latch mechanism to its initial position thereby allowing said first mechanism to again reposition, release engagement with, and reengage and hold said first named means at a second intermediate position between said limit positions; and said second means being again operable upon a further component of fluid flow to move said latch mechanism to said second position to release and enable disengagement of said first mechanism with said first named means to enable said first named means to move to the other limit position.

15. Fluid dispensing apparatus comprising: a fluid meter; valve means controlling fluid flow through said meter including spring means biasing said valve means toward a closed position; actuating means for said valve means, including a shaft operatively connected to the valve means; a member fixed to said actuating means manually operable in opposition to said spring means to open the valve means; means for controlling closure of said valve means in a plurality of staged steps; automatic resetting latch means shiftable between two positions and operative in one of said positions to releasably engage said control means with said shaft upon manual operation of said member to actuate said valve means to a full open position and thereafter operative in each of said two positions to releasably engage said control means at varied partially opened positions of said valve means; fluid flow predetermining mechanism drivingly connected to said meter and operatively adapted to move said latch means to one of its positions from the other position a plurality of times in succession in accordance with predetermined components of fluid flow whereby said control means will gradually close said valve means in a plurality of stages.

16. Predetermining dispensing apparatus comprising: a fluid meter; a flow control valve assembly in fluid communication with said fluid meter comprising a valve body having a partition therein forming an inlet passage and an outlet passage, there being an opening in said partition providing a valve seat on the inlet passage side, a cylindrical member having one closed end and one open end fixed in said inlet passage coaxial with said opening, said closed end facing said opening and having an aperture formed therein coaxial with said opening, bleed means connecting both ends of said cylindrical member to the valve inlet passage, a hollow valve stem concentric to and extending through said opening and slidably positioned in said aperture, a piston member slidably disposed in said cylindrical member and fastened around one end of said valve stem, a valve member disposed externally on said valve stem intermediate the ends thereof, spring means acting between said one end of said valve stem and said valve body to bias said valve member to abut said valve seat, a pilot valve in said hollow valve stem having an actuating rod extending coaxial internally of and projecting from the other end of said valve stem and having a head portion on said projecting end, spring means coacting between said head portion and the valve stem to bias said pilot valve to a closed position, and lever means on the interior of said valve body coacting with said pilot valve head portion for controlling valve position; means connected to said lever means for actuating said valve assembly including a manual means to position said valve assembly in the opened position; means operative by movement of said valve actuating means to the valve open position to retain said actuating means in said valve open position including a pivoted latch lever biased in one direction by said spring biased open valve and a latching assembly cooperating with the latch lever to prevent movement in said one direction; and flow registering mechanism connected to said meter and operable to actuate, release and reactuate said latching assembly at least once in accordance with predetermined components of fluid flow through said meter, said latching assembly cooperating with said latch lever to release and relatch said latch lever during said first actuation by said registering mechanism, to again release and relatch said latch lever during said release by said registering mechanism and to release said latch lever during said reactuation by said registering mechanism whereby said latch lever permits the valve to move to a closed position in a plurality of staged movements.

References Cited in the file of this patent

UNITED STATES PATENTS

| | | |
|---|---|---|
| 1,759,396 | Granberg | May 20, 1930 |
| 2,057,333 | Guibert | Oct. 13, 1936 |
| 2,247,139 | Thoresen et al. | June 24, 1941 |
| 2,265,325 | Steen | Dec. 9, 1941 |
| 2,289,867 | Berch | July 14, 1942 |
| 2,634,884 | Bliss | Apr. 14, 1953 |

U. S. DEPARTMENT OF COMMERCE
PATENT OFFICE

CERTIFICATE OF CORRECTION

Patent No. 2,818,198                          December 31, 1957

George E. Batchelder et al.

It is hereby certified that error appears in the printed specification of the above numbered patent requiring correction and that the said Letters Patent should read as corrected below.

Column 4, line 64, for "a of" read -- of a --; column 6, line 33, for "roll" read -- roller --; column 7, line 46, strike out "section of the arm 222 allowing the arm 222 to hang" and insert the same before "down" in line 44, same column.

Signed and sealed this 4th day of March 1958.

(SEAL)
Attest:

KARL H. AXLINE                                          ROBERT C. WATSON
Attesting Officer                                    Commissioner of Patents